US009376275B2

(12) United States Patent
Houston et al.

(10) Patent No.: US 9,376,275 B2
(45) Date of Patent: Jun. 28, 2016

(54) ARTICLE FEEDER WITH A RETRACTABLE PRODUCT GUIDE

(71) Applicant: United States Postal Service, Washington, DC (US)

(72) Inventors: Edward F. Houston, Bristow, VA (US); Juan A. Roman, Fairfax, VA (US); William P. McConnell, Woodstock, MD (US); Robert E. Hume, Woodstock, MD (US); Thomas A. Hillerich, Louisville, KY (US); Darin Dickey, Owings Mills, MD (US)

(73) Assignee: United States Postal Service, Washington, DC (US)

( * ) Notice: Subject to any disclaimer, the term of this patent is extended or adjusted under 35 U.S.C. 154(b) by 190 days.

(21) Appl. No.: 13/797,698

(22) Filed: Mar. 12, 2013

(65) Prior Publication Data

US 2014/0271088 A1 Sep. 18, 2014

(51) Int. Cl.

| | |
|---|---|
| ***B65G 59/00*** | (2006.01) |
| ***B65H 1/02*** | (2006.01) |
| ***B07C 1/02*** | (2006.01) |
| ***B65H 1/26*** | (2006.01) |

(Continued)

(52) U.S. Cl.

CPC ................ *B65H 1/025* (2013.01); *B07C 1/025* (2013.01); *B65H 1/263* (2013.01); *B65H 1/30* (2013.01); *B65H 7/02* (2013.01); *B65H 2301/422542* (2013.01); *B65H 2301/422544* (2013.01); *B65H 2405/214* (2013.01); *B65H 2511/51* (2013.01); *B65H 2511/515* (2013.01); *B65H 2513/41* (2013.01); *B65H 2701/1916* (2013.01)

(58) Field of Classification Search

CPC ...... B65G 59/00; B65G 59/04; B65G 59/045; B65G 59/026; B65H 1/18; B65H 3/04; B65H 5/00; B65H 1/14; B65H 1/24; B65H 5/021; B65H 5/08; B65H 1/025; B65H 1/263; B65H 1/30; B65H 5/16; B65H 7/02; B65H 1/26; B65H 1/266; B07C 1/04; B07C 1/06; B07C 1/025; B07C 1/02

USPC ............ 414/795.7, 795.8, 797, 797.2, 797.6, 414/798.7

See application file for complete search history.

(56) References Cited

U.S. PATENT DOCUMENTS

| | | | |
|---|---|---|---|
| 3,485,488 | A | 12/1969 | Ellison |
| 3,649,002 | A | 3/1972 | Burkhardt |

(Continued)

OTHER PUBLICATIONS

The International Search Report and Written Opinion mailed Sep. 9, 2014 for International Patent Application No. PCT/US 14/23300, which claims priority from captioned U.S. Appl. No. 13/797,698.

(Continued)

*Primary Examiner* — Saul Rodriguez
*Assistant Examiner* — Lynn Schwenning
(74) *Attorney, Agent, or Firm* — Knobbe Martens Olson & Bear LLP

(57) ABSTRACT

An automatic stack feeder having a moveable stack or product guide is disclosed. The automatic stack feeder may be configured to receive a stack of articles and a container enclosing a stack of articles. To ensure the stack of articles is properly supported following unloading from the container, the stack guide is moveable between a first and a second position, wherein the stack guide is in contact with the stack of articles while in the first position, and not in contact with the stack when in the second position.

26 Claims, 5 Drawing Sheets

(51) Int. Cl.
*B65H 1/30* (2006.01)
*B65H 7/02* (2006.01)

(56) References Cited

U.S. PATENT DOCUMENTS

| | | | | |
|---|---|---|---|---|
| 4,257,587 | A | 3/1981 | Smith | |
| 4,579,501 | A * | 4/1986 | Fox | 414/347 |
| 4,595,188 | A | 6/1986 | Wiley et al. | |
| 5,064,341 | A | 11/1991 | Pippin | |
| 5,165,675 | A | 11/1992 | Kanaya | |
| 5,271,710 | A * | 12/1993 | Decharran et al. | 414/798.9 |
| 5,409,204 | A | 4/1995 | Strohmeyer et al. | |
| 5,630,697 | A * | 5/1997 | Black, Jr. | 414/798.6 |
| 5,755,437 | A | 5/1998 | Ek | |
| 5,829,742 | A | 11/1998 | Rabindran et al. | |
| 5,893,701 | A * | 4/1999 | Pruett | 414/798.2 |
| 5,947,468 | A * | 9/1999 | McKee et al. | 271/210 |
| 5,992,610 | A | 11/1999 | Dufour et al. | |
| 6,276,586 | B1 | 8/2001 | Yeo et al. | |
| 6,503,044 | B1 * | 1/2003 | Enenkel | 414/404 |
| 6,679,491 | B2 | 1/2004 | Luebben et al. | |
| 6,715,755 | B2 | 4/2004 | Sussmeier | |
| 7,025,347 | B2 | 4/2006 | Masui et al. | |
| 7,195,236 | B2 | 3/2007 | Hillerich | |
| 7,537,207 | B2 | 5/2009 | Kutzer et al. | |
| 7,552,918 | B2 | 6/2009 | Blackwell et al. | |
| 7,703,769 | B2 | 4/2010 | Schwarzbauer | |
| 7,712,735 | B2 | 5/2010 | Chorier-Pichon et al. | |
| 2002/0011703 | A1 | 1/2002 | Tomiyama et al. | |
| 2002/0153654 | A1 | 10/2002 | Blackwell et al. | |
| 2006/0087068 | A1 | 4/2006 | Bittenbender et al. | |
| 2007/0085259 | A1 | 4/2007 | Grogor et al. | |
| 2007/0252321 | A1 | 11/2007 | Kutzer et al. | |
| 2010/0032889 | A1 | 2/2010 | Krause et al. | |
| 2010/0038840 | A1 | 2/2010 | Watanabe et al. | |
| 2010/0258407 | A1 | 10/2010 | Krause et al. | |
| 2010/0329833 | A1 | 12/2010 | Ambroise et al. | |
| 2011/0278785 | A1 | 11/2011 | Franzone et al. | |
| 2012/0013064 | A1 | 1/2012 | Samain et al. | |

OTHER PUBLICATIONS

U.S. Office Action dated Sep. 25, 2014 for U.S. Appl. No. 13/801,749, which is related to captioned U.S. Appl. No. 13/797,698.

* cited by examiner

ARTICLE FEEDER WITH A RETRACTABLE PRODUCT GUIDE

BACKGROUND

1. Field

This disclosure relates to the field of automatic feeding and sorting of items or articles. More specifically, the present disclosure relates to a retractable product guide in an automatic stack feeder.

2. Description of the Related Art

Articles, such as items of mail, are frequently provided in bulk and must be sorted into individual articles or items for processing or routing. If the stack of articles in the feeder is not positioned correctly, the stack of articles may lean, slump, fall, or otherwise be incorrectly aligned for singulation or shingulation, and the process of sorting individual articles may be slowed down or hampered with errors, such as picking more than one article at a time, or damaging articles during picking. As a stack of articles moves along an automatic stack feeder, the stack is supported by and moves along a product or stack guide. Articles or stacks of articles for use in automatic stack feeders are often provided in containers. The containers are deposited onto a conveyor belt of an automatic stack feeder, and are positioned flush with the stack guide. The containers have a sidewall of a certain thickness, and when the stack of articles is unloaded from the container, due to the thickness of the container's sidewall, the stack of articles may not be in contact with the stack guide. Thus, there is a need to ensure that the stack of articles, once unloaded from the container, is able to be in contact with the stack guide, so the stack of articles can be properly supported as the stack advances along the automatic stack feeder.

SUMMARY

Some aspects of the present disclosure include a stack feeder comprising a frame; a singulator connected to one end of the frame; a conveyor disposed on the frame, the conveyor configured to receive a stack of articles and a container, the conveyor further configured to move the stack of articles and the container toward the singulator; a motor connected to the frame; a stack guide connected to the motor and aligned substantially parallel to the belt, wherein the stack guide comprises a continuous, surface configured to contact an edge of the stack of articles; and wherein the motor is operable to move the stack guide from a first position to a second position to accommodate receiving the container onto the conveyor.

In some embodiments, the stack feeder further comprises a sensor configured to detect the presence of the container on the conveyor; and a controller in communication with the sensor and the motor, the controller configured to control movement of the motor to move the stack guide between the first position and the second position in response to detection of the presence of the container on the conveyor.

In some embodiments, the sensor is further configured to detect the absence of the container on the conveyor, and wherein the controller is configured to control the movement of the stack guide between the second and the first positions in response to detection of the absence of the container.

In some embodiments, when the stack guide is in the first position, the stack guide is in contact with the stack of articles.

In some embodiments, when the stack guide is in the second position, the stack guide is in contact with the container and not with the stack of articles.

In some embodiments, when the presence of the container is detected, the controller is configured to control movement of the stack guide from the first position to the second position.

In some embodiments, when the absence of the container is detected, the controller is configured to control movement the stack guide from the second position to the first position.

In some embodiments, the stack guide is moveable among a plurality of positions between the first position and the second position.

In another aspect, a system for unloading a container comprises a container configured to hold articles; an automatic stack feeder comprising: a singulator; a conveyor configured to receive a first stack of articles and the container, wherein the container has a second stack of articles therein, the conveyor further configured to move the first stack of articles and the container toward the singulator; a stack guide aligned substantially parallel to the conveyor, wherein the stack guide comprises a continuous, substantially vertical surface configured to contact an edge of the first and second stacks of articles, and wherein the stack guide is moveable from a first position to a second position; a sensor configured to detect the presence of the container on the conveyor; and a controller, in communication with the sensor, and configured to control movement of the stack guide between the first position and the second position in response to the presence of the container on the conveyor.

In some embodiments, the stack guide is configured to be in contact with the first stack of articles when the stack guide is in the first position.

In some embodiments, the stack guide is configured to be in contact with the container, and not in contact with the first stack of articles, when the stack guide is in the second position.

In some embodiments, the stack guide further comprises a motor in communication with the controller, and wherein the motor is configured to move the stack guide between the first and second positions.

In some embodiments, the sensor is further configured to detect the absence of the container on the conveyor, and wherein the controller is configured to control the movement of the stack guide between the second and the first position in response to the absence of the container.

In some embodiments, when the presence of the container is detected, the controller is configured to move the stack guide from the first position to the second position.

In some embodiments, when the absence of the container is detected, the controller is configured to move the stack guide from the second position to the first position.

In some embodiments, the stack guide is moveable among a plurality of positions between the first and the second positions.

In another aspect, a method of sorting articles comprises operating a stack feeder comprising a stack guide; receiving a container having a first stack of articles therein onto a conveyor of the automatic stack feeder; detecting the presence of the container on the conveyor; moving the stack guide in response to the detected presence of the container; unloading the first stack of articles from the container; detecting the absence of the container; and moving the stack guide in response to the absence of the container.

In some embodiments, moving the stack guide in response to the detected presence of the container comprises moving the stack guide from a first to a second position.

In some embodiments, moving the stack guide in response to the absence of the container comprises moving the stack guide from the second position to the first position.

In some embodiments, unloading a second stack of articles from the container comprises: moving the first stack of articles out of the container onto the conveyor; combining the first stack of articles with a second stack of articles already on the conveyor; and removing the container from the conveyor.

In some embodiments, the method further comprises contacting the stack guide with the combined first and second stacks of articles with the stack guide in the first position.

In some embodiments, before detecting the presence of the container, the stack guide is in contact with the first stack of articles when the stack guide is in the first position.

In some embodiments, the stack guide is in contact with the container, and not in contact with the first stack of articles, when the stack guide is in the second position.

In some embodiments, the stack guide is connected to a motor which moves the stack guide from the first position to the second position and from the second position to the first position.

In another aspect, a system for sorting articles comprises operating a stack feeder comprising a stack guide; means for receiving a container having a first stack of articles therein onto a conveyor of the automatic stack feeder; means for detecting the presence of the container on the conveyor; means for moving the stack guide in a first direction in response to the detected presence of the container; means for unloading the first stack of articles from the container; means for detecting the absence of the container; and means for moving the stack guide in a second direction in response to the absence of the container.

DETAILED DESCRIPTION

Figure 1:
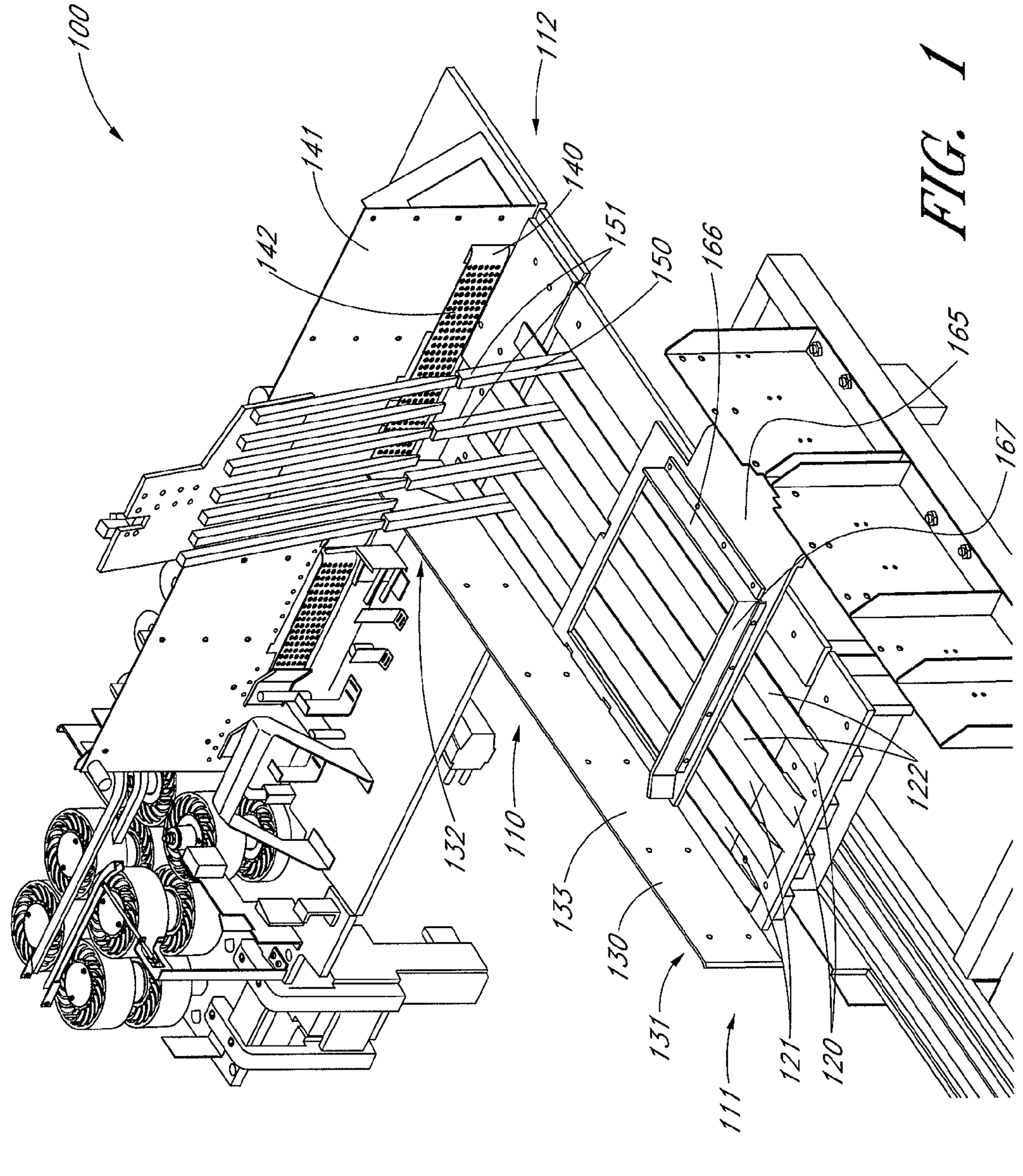
FIG. 1 is a perspective view of an embodiment of a singulation apparatus.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

As used herein, the term singulation may mean the separation of a stack of articles into single articles that move into a sorting or picking machine in a line of single articles. The term shingulation may mean the separation of articles from a bulk stack, but wherein the articles are not entirely segregated from the other articles of the stack. Shingulated articles partially overlap each other, similar to the overlapping pattern of shingles on a roof, and move into a sorting or picking machine in an overlapping, continuous line of articles. As used herein, a singulator may be capable of both singulating and shingulating a stack of articles; the use of the term singulator is used to describe both processes for convenience and ease of description.

The term motor as used herein may refer to any device which provides a mechanical or electrical motive force to a component of the automatic high speed flats feeder. The motors described herein may be mechanically or electrically driven, or may be a source of pneumatic or hydraulic pressure, or may be any other type of motors.

The system described herein provides for faster and more efficient unloading of containers holding stacks of articles intended for separation, singulation, or shingulation, such as, for example, articles of mail. Articles such as mail comprising magazines and catalogs, which are too long in one direction to be considered standard sized letters are called flats. Flats are often flexible and may sometimes be flimsy, which can cause problems in automatic stack feeders during singulation or shingulation. These articles or flats may be processed as a stack. As used herein, the term stack may refer to a single article or to one or more articles grouped together, and the term may be used in an automatic stack feeder. Articles, such as flats, may have varying dimensions, including long dimension or edge, a short dimension or edge, a front side, and a back side. Generally, when processed on an automatic stack feeder, the long dimension, which is often the binding edge of the articles or flats in the stack is disposed parallel to the floor, and the front of each article, or flat, is disposed facing the same direction, and the individual articles in the stack are disposed front to back. The short edge is usually aligned with a vertical wall, or stack guide, while being processed in the automatic stack feeder.

Although the present disclosure describes systems and devices for sorting and/or singulating articles, such as mail, catalogs, and magazines, it will be apparent to one of skill in the art that the disclosure presented herein is not limited thereto. The embodiments described herein provide for a system and method of ensuring the stack is in proper contact with a stack guide after unloading the stack of articles from a container.

FIG. 1 depicts a perspective view of an embodiment of an automatic stack feeder 100. The automatic stack feeder 100 comprises a frame 110, a belt 120, a stack guide 130, a singulator 140, and a paddle 150.

The Frame 110 provides support for the belt 120, the stack guide 130, the singulator 140, and the paddle 150. Generally, the frame 110 is roughly table shaped, being elevated off the ground by a plurality of legs, (not shown) or by other means known in the art. The frame 110 has a first end 111 and a second end 112.

In some embodiments, the belt 120 may comprise a plurality of smaller belts. In some embodiments, belt 120 may be a single belt. The belt 120 is a continuous loop disposed on rollers (not shown), located near the first end 111 and the second end 112 of the frame 110, and which are rotatably attached to the frame 110. The rollers are attached to a motor and are configured to rotate, thus causing the belt 120 to move like a standard conveyor belt. In the illustrated embodiment, the belt 120 comprises smaller belts which are generally aligned parallel to each other and are separated by a distance. The belt 120 runs lengthwise along the automatic stack feeder 110 from the first end 111 to the second end 112. In some embodiments, there may be openings 121 between the belts 120. The belts 120 can be, for example, independently driven, or driven together. A top surface 122 of the belt 120 is disposed within the same plane as the generally horizontal flat surface of the frame 110, and is generally parallel to the floor.

The stack guide 130 is connected to the frame on bearings (not shown), and is disposed generally alongside and parallel to the belt 120. The stack guide 130 has a first end 131, disposed generally near the first end 111 of the frame 110, and has a second end disposed generally near the second end 112 of the frame 110. In the illustrated embodiment, the stack guide 130 comprises a vertical surface 133 extending substantially vertically, and at a right angle from the horizontal plane of the frame 110 and the belt 120. The stack guide 130 is configured to provide support to an edge of a stack of articles (not shown) when the stack of articles is located on the belt 120, as it is processed by the automatic stack feeder 100. As will be described in further detail with respect to FIG. 2, the stack guide 130 is configured to move the vertical surface 133 between a first position and a second position. In some embodiments, the stack guide 130 is configured to move the vertical surface 133 between a variety of positions.

The singulator 140 is connected at the second end 112 of the frame 110. The singulator 140 comprises a vertical portion 141 which is mounted at a right angle to the generally flat horizontal surface of the frame 110. The singulator 140 may be attached directly to a flat surface at the second end 112 of the frame 110. In some embodiments, the singulator 140 may be disposed in close proximity to the second end 112 of the frame 110 and within the vertical portion 141, while the second end 112 of the frame 110 is located near or in contact with the singulator 140. The singulator 140 is disposed generally vertically, at a right angle to the generally horizontal plane of the frame 110. The singulator 140 comprises a singulation belt 142 having perforations disposed therein such that air flow is possible through the singulation belt 142, while the singulation belt 142 maintains its structural integrity. A vacuum force is applied through the perforations in the singulation belt 142 of the singulator 140, so that as articles in the stack (not shown) located on the belt 120 are moved forward into contact with the singulation belt 140, the vacuum force acts on the adjacent article's surface. The vacuum force applied through the singulation belt 142 is sufficient to attract the lead article in the stack of articles, and to maintain the lead article in position against the singulation belt 142. The process of singulation is described in more detail in U.S. patent application Ser. No. 13/797,291, filed on Mar. 12, 2013, the contents of which are herein incorporated by reference in their entirety.

The paddle 150 is attached to a track or drive belt (not shown), which is also attached to the frame 110. The track or drive belt is, in turn, attached to a motor. As the motor operates, the track or drive belt moves, which moves the paddle 150. The motor and track are connected and configured to move the paddle 150 in a direction either toward or away from the singulator 140. The paddle 150 is moveable along the length of the frame 120. In some embodiments, the paddle 150 may comprise a plurality of vertical support members 151. The vertical support members 151 are attached to a base (not shown), and extend up through the openings 121 between the belts 120.

In some embodiments, the vertical position of the paddle 150 is adjustable. That is, the angle of the paddle 150 and the vertical support members 151 in relation to the generally flat horizontal surface of the frame 110 is adjustable. In some embodiments, the paddle 150 extends upward from the horizontal surface of the frame 110 at an angle other than a right angle. In some embodiments, the paddle 150 is disposed at an angle from 0 to 10° from vertical. In some embodiments, the paddle 150 and the vertical support members are connected to a motor which moves the paddle 150 vertically such that the vertical support members are moveable between a position below the surface of the belt 120 and a position where the vertical support members 151 protrude up through the openings 121 of the belt 120.

The paddle 150 is configured to provide vertical support for the stack of articles (not shown) as the stack moves along with the belt 120 toward the singulator 140. The paddle 150 is moveable independent of the belt 120, and the belt 120 is moveable independent of the paddle 150. The belt 120 is configured to move the stack of articles either toward or away from the singulator 140, as required. Generally, during operation of the automatic stack feeder, the belt 120 advances the stack toward the singulator 140 such that the lead article of the stack impinges the singulator belt 142, and therefore can be singulated.

Frame 110 also provides support for a carrier 165. The carrier 165 is attached on one side to a moveable linear guide (not shown) which runs parallel to the frame 110 and the belts 120, opposite the stack guide 130. The carrier 165 comprises a first surface 166 parallel to the belts 120 and a second surface 167 which is generally vertical and is disposed perpendicular to the top surface 122 of the belts 120. The carrier 165 is attached to the frame 110 such that the carrier 165 does not make contact with the belts 120. The carrier 165 is configured to receive a container. The container rests on the first surface 166 and abuts the second surface 167 on a rear surface of the container. In this way, the container can be moved back and forth along the frame 110 by the carrier 165, independent of the movement of the belts 120.

Frame 110 also provides support for receiving a container (not shown) in (only the footprint of the container 160 is shown).

Figure 2:
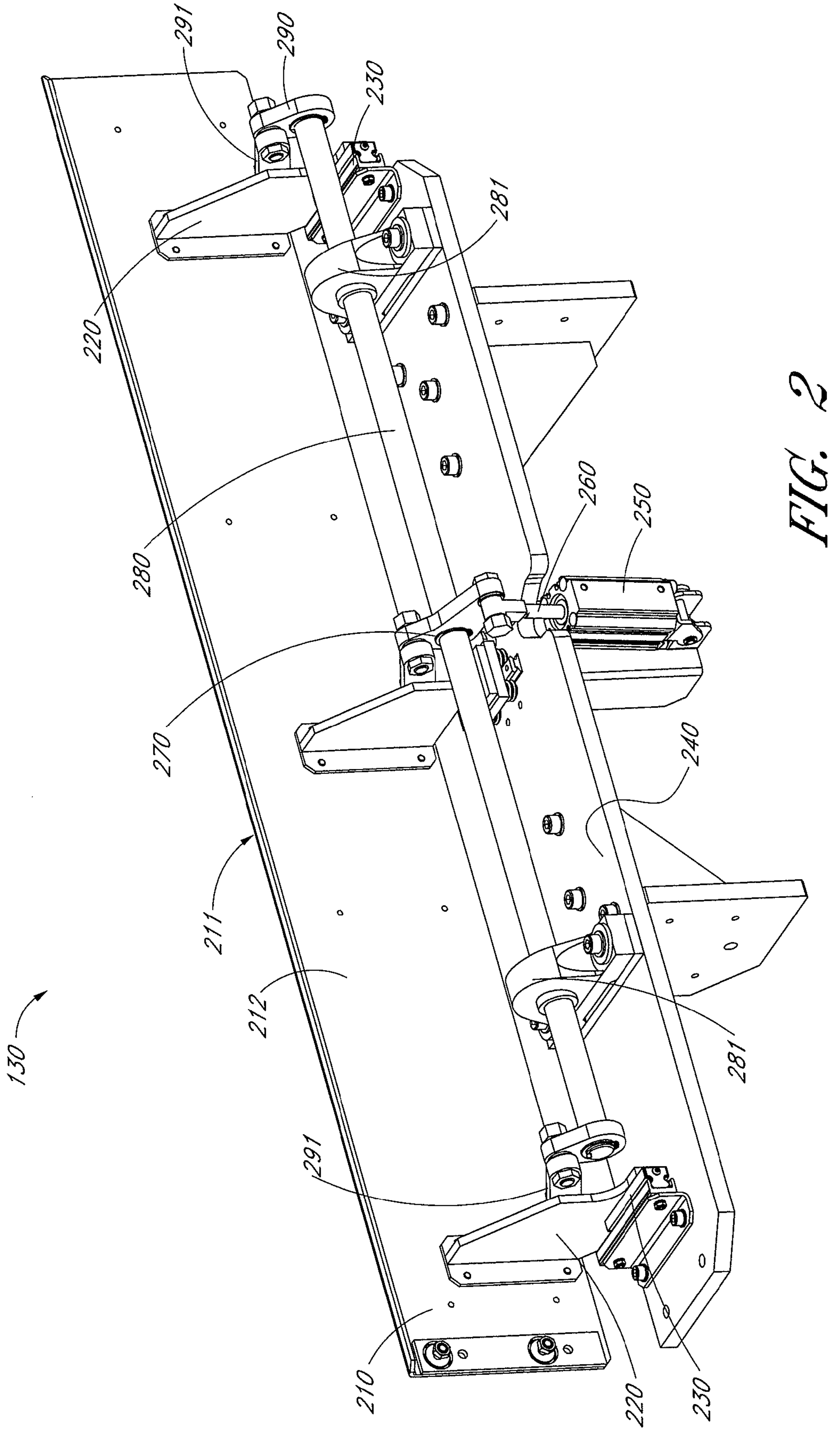
FIG. 2 is a perspective view of an embodiment of a stack guide for use with the singulation apparatus of FIG. 1.

FIG. 2 is a perspective view of one embodiment of the stack guide 130. The stack guide 130 comprises a vertical portion 210, which has a smooth front side 211 which is configured to be in contact with the stack of articles. The vertical portion 210 has a back side 212 to which is attached to one or more braces 220. The braces 220 are fixedly attached to the back side 212 of the vertical portion 210 at intervals along the length of the vertical portion 210. The braces 220 are also attached to one or more bearings 230. In some embodiments, not all of the braces 220 are attached to a bearing 230. The bearings 230 are connected to a guide support 240. The guide support 240 is fixedly connected to the frame 110 (not shown) so as to be parallel and alongside the belt 120. The bearings 230 are configured to allow the braces 220 to slidably move in a linear direction. As the braces 220 move, the vertical portion 210 of the stack guide 130 also moves. In some embodiments, the direction of movement allowed by the bearings 230 is in a direction perpendicular to the length of the stack guide 130 and the frame 110, as will be described in more detail below.

The stack guide 130 further comprises a motor 250 which is configured to move the vertical portion 210 of the stack guide 130. The motor 250 is connected to a piston 260. The piston 260 is connected to the motor 250 such that as the motor 250 operates, the piston 260 moves. In some embodiments, the motor 250 is a pneumatic cylinder powered by an air supply generating sufficient energy to move the piston 260 from a first position to a second position, or to any position therebetween. In some embodiments, the piston 260 extends vertically from the motor and engages a ring gear 270. In some embodiments, the piston 260 comprises teeth on one end which engage with the gear teeth on the ring gear 270. The ring gear 270, in turn, is connected to a crank shaft 280. The crank shaft 280 is a cylindrical rod which runs lengthwise in a direction parallel to the vertical portion 210, along the back side 212 of the vertical portion 210. The ring gear 270 encircles the crank shaft 280, and, together with the piston 260, provides the mechanical linkage and/or gear system which translates the linear, vertical motion of the piston 260 into a rotational movement of the crank shaft 280, along the long axis of the crank shaft 280.

The crank shaft 280 comprises one or more cams 290 attached at the ends of the crank shaft 280 and, in some embodiments, at intervals along the length of the crank shaft 280. The crank shaft is supported in housings 281 which comprise bearings that support the crank shaft 280 and also enable it to rotate about its long axis. The housings 281 are attached to the guide support 240 and support the crank shaft 280.

The cams 290 may be ovoid, egg shaped, hourglass shaped, may comprise various combinations of linkages, or may be of any other desired shape or type. The cams 290 may further comprise tie rods 291 rotatably connected to the cams 290. The tie rods 291 are connected to the back side 212 of the vertical portion 210. The cams 290 and tie rods 291 are connected to each other and to the vertical portion 210 so as to be capable of translating the rotational motion of the crank shaft 280 into linear motion of the vertical portion 210.

For example, while unloading a stack of items from a container, it may be desirable to move the vertical portion 210 of the stack guide 130. The movement of the vertical portion 210 will now be described. The vertical portion 210 is in an original, or first position, where the front side 211 of the vertical portion 210 may be in contact with an edge of a stack of articles. To move the vertical portion 210, a control signal is sent from a controller to the motor 250. The control signal may be an electrical signal, a pneumatic signal, or any other desired signal capable of initiating motor operation. In some embodiments, the motor is a pneumatic cylinder, and therefore a pneumatic signal is sent to the motor 250. The pneumatic signal causes the motor 250 to operate, which moves the piston 260. The piston 260 moves linearly upward. The gear teeth on the piston 260 engage with gear teeth on the ring gear 270. As the piston 260 moves upward, the enmeshing gear teeth cause the ring gear 270 to rotate. The ring gear 270 then rotates the crank shaft 280, which rotates about the axis extending along the length of the crank shaft 280 and running through the center of the crank shaft 280.

The rotation of the crank shaft 280 causes cams 290 to rotate, and as the cams 290 rotate, the tie rods 291 move. The tie rods 291 are attached to the vertical portion 210, such that the movement of the tie rods 291 causes the vertical portion 210 to move to a second position.

When the pneumatic signal is removed from the motor 250, or is applied to a different port on the pneumatic cylinder, the piston 260 moves downward, and the above process repeats, but in reverse, and the vertical portion 210 moves back to its original position.

The distance the vertical portion 210 travels upon actuation of the motor 250 may be equivalent to the thickness of a wall of the container 160. In some embodiments, the motor is configured such that the vertical portion 210 is positionable at a plurality of locations or positions. This may be accomplished by moving the piston 260 a specified amount, and holding the position of the piston 260 through operation of the motor 250, thus maintaining the position of the vertical portion 210. By having a plurality of possible positions, the vertical portion 210 of the stack guide 130 may be used for a variety of containers 160 whose wall thickness varies. In some embodiments, the distance the vertical portion 210 of the stack guide 130 moves is programmable using a controller which will be described in greater detail below.

It will be understood that the above description is exemplary only. A person of skill in the art will understand that the movement of the vertical portion may be accomplished by other means, such as an electric motor, a different gearing system, or any other desired method.

In some embodiments, the stack guide moves 130. In some embodiments, the entire stack guide 130 does not move, but some of the components of the stack guide 130 move, including the vertical portion 210.

Figure 3A:
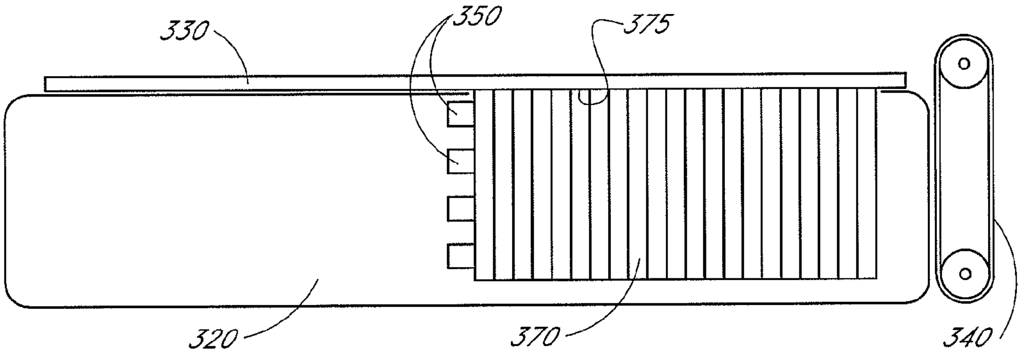
FIG. 3A is a top plan view of a stack of articles in an automatic stack feeder.

FIG. 3A depicts a top view of an embodiment of an automatic stack feeder 300 with a stack of articles. A first stack 370 of articles is located on a belt 320, and is supported along its rearward face by a vertical support member 350, and along one of the short edges or short dimensions a stack guide 330. The paddle 350 is in contact with the trailing article 372 in the first stack 370, and operates as described elsewhere herein. The first stack 370 is supported on an edge 375 by the stack guide 330. By maintaining the edge 375 of first stack 370 in contact with the stack guide 330, a uniform edge 375 when the articles in the stack reach the is present at the singulator 340, which reduces the possibility of misfeeds, damage to the articles, and other errors in singulation.

The stack guide 330 is depicted in a first position where the stack guide is in contact with the edge 375 of the first stack 370. The edge 375 of the first stack 370 is aligned against the stack guide 330, and the first stack 370 is in flush contact with the stack guide 330. The stack guide 330 keeps the edge 375 aligned as the first stack 370 is moved toward the singulator 340.

Figure 3B:
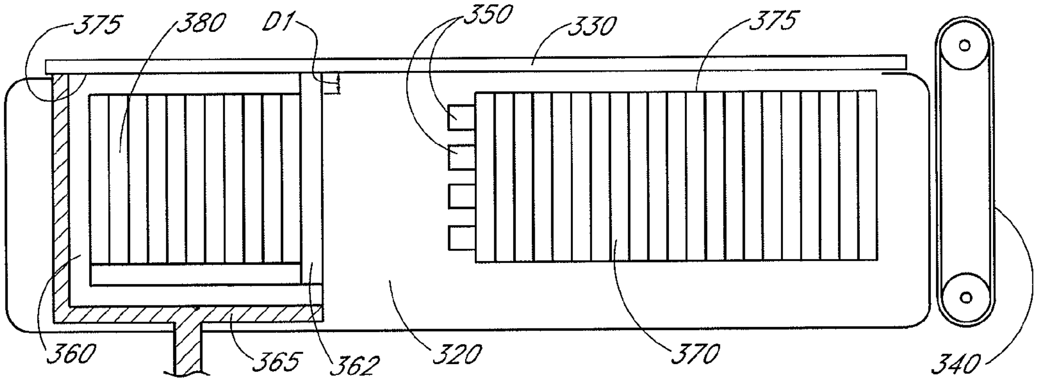
FIG. 3B is a top plan view of a stack of articles and a container in an automatic stack feeder.

FIG. 3B depicts a top plan view of an embodiment of the automatic stack feeder of FIG. 3A, additionally having a container. The container 360 encloses a second stack 380 of articles. The second stack 380 of articles is generally positioned within the container 360 such that an edge of the articles having the shorter dimension is in contact with a wall of the container 360. The wall against which the stack 380 is positioned is located on the side of the container 360 which will be in contact with the stack guide 330 when the container 360 is placed on the belt 320.

The container 360 is placed on the carrier 365 so that the stack 380 can be unloaded onto the belt 320 for singulation. In some embodiments, the articles are unloaded using a paddle (not shown) which pushes the stack 380 forward, through an open door 362 of the container 360. Systems and methods of unloading containers in an automatic stack feeder are described in more detail in U.S. patent application Ser. No. 13/797,731, filed on Mar. 12, 2013, the entire contents of which are hereby incorporated by reference.

The container 360 comprises at least one wall 365 which has a thickness D1. When placing the container 360 on the belt 320, the stack guide 330 is moved to accommodate the thickness D1 of the wall 365. This ensures that the second stack 380 aligns with the first stack 370 when the second stack 380 is unloaded from the container 360, FIG. 3B shows the stack guide 330 in a second position, the stack guide 330 being moved to accommodate the container 360. When the container 360 is unloaded, the stack 380 is pushed through the open door 362. At this point, the stack 380 is not aligned with the stack guide 330, but is disposed away from the stack guide 330 at a distance equal to the thickness D1 of the wall 365.

Figure 3C:
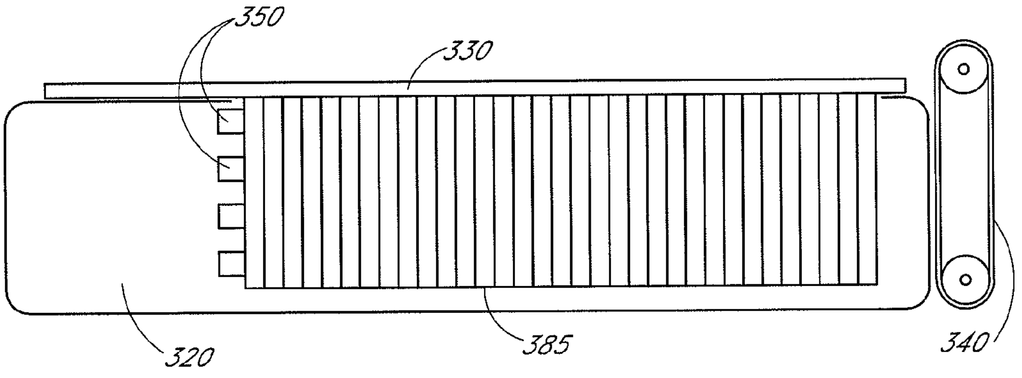
FIG. 3C is a top plan view of a combined stack of articles after unloading a stack of articles from the container depicted in FIG. 3B

FIG. 3C depicts the automatic stack feeder of FIGS. 3A and 3B following the removal of the container 360. The stack guide 330 is shown in the first position, having been moved following removal of the container 360. After removal from the container 360, the second stack 380 is merged with the first stack 370, by moving the second stack 380 forward until the leading article in the second stack 380 contacts the trailing article 372 in the first stack 370, to form a merged stack 385. With the stack guide 330 initially in the second position, the merged stack 385 is not in flush contact with the stack guide 330. Following removal of the container from the belt 320, the stack guide 330 is moved back to the first position, whereupon the stack guide 330 makes contact with and provides support to the merged stack 385, thus helping to ensure efficient and accurate singulation of the articles in the merged stack 385.

Figure 4:
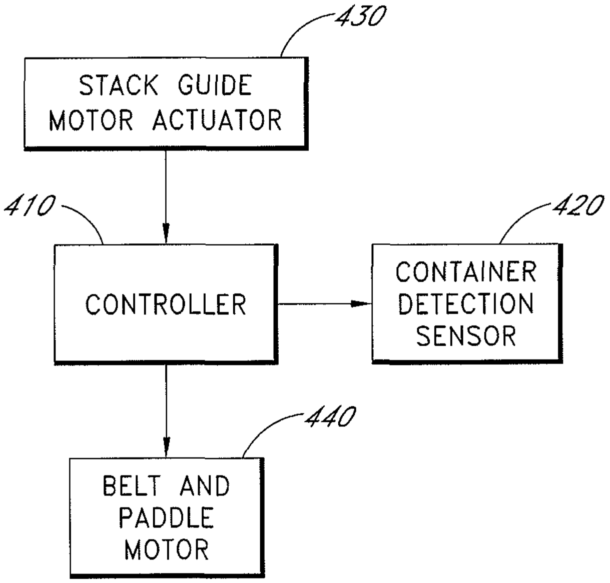
FIG. 4 is a schematic diagram of a controller's connections to components of the automatic stack feeder.

FIG. 4 depicts a block diagram of an embodiment of a controller system 400. The controller system 400 comprises a controller 410, a container detection sensor 420, a stack guide motor actuator 430, belt and paddle motors 440, and a carrier motor 450. The controller 410 may be a processor based controller and may include a memory. The controller 410 is in electrical communication with the container detection sensor 420, and the stack guide motor actuator 430, and the belt and paddle motors 440. The controller is configured to send and receive electrical signals to the components with which it is in electrical contact.

In some embodiments, the container detection sensor 420 may comprise a weight sensor. The weight sensor may be attached to the belt 120 or the frame 130. When the weight sensor senses the weight of the container 160 on the belt 120 or the frame 130, the weight sensor sends a signal to the controller 410 that the container 160 is present. The controller 410 is in electrical communication with the carrier motor 450. The carrier motor 450 may send and receive signals to and from the controller 410. For example, the carrier motor 450 may send a signal regarding the position of carrier 365 along the carrier track. This position signal may tell the controller 410 where the carrier 365 is located so that the controller can coordinate the movement of the stack guide 130 and other components of the automatic feeder 100 for receiving and unloading the container 360. Specifically, when the carrier 365 communicates to the controller 410 that it is approaching the stack guide 130, the controller 410 may send a signal to the stack guide motor actuator 430 to move the stack guide 130 to accommodate the container 360.

In some embodiments, for example, where the carrier motor 450 generates signals regarding its position relative to the belt 120 and the stack guide 130, the container detection sensor 420 may be omitted. In some embodiments, the container detection sensor 420 and the carrier motor 450 may both provide signals regarding the position of the carrier 365 and/or container 360. These signals may be used by the controller 410 together or as independent indications of the position of the container 360.

In some embodiments, the stack guide motor actuator 430 may be configured to generate an electric signal to an electric stack guide motor. In some embodiments, the stack guide motor actuator 430 may be configured to send an electric signal to a valve on a source of air or hydraulic pressure, which valve permits the flow of fluid into the motor.

In some embodiments, the controller 410 receives input signals from the container detection sensor 420 and/or the carrier motor 450. In operation, the container detection sensor 420 may be an optical sensor configured to detect when a container is placed onto the automatic stack feeder 100. In some embodiments, the container detection sensor 420 may be any type of desired sensor for detecting the presence of the container 160. In some embodiments, the carrier motor 450 may send a signal to the controller 410 when the carrier 365 and the container 360 are approaching the belt 120 and the stack guide 130. The controller 410 receives a signal from the carrier motor 450 and/or the container detection sensor 420, indicating that a container 160 is, or is about to be moved into a position above the belt 120. Upon receiving the signal regarding the approaching carrier 365, the controller 410 sends a signal to the stack guide motor actuator 430, which initiates movement of the motor 250, and the stack guide 130 moves to accommodate the container 160. This process will be described in more detail below.

The controller 410 receives the signal from the weight sensor and/or the carrier motor 450, and the controller 410 sends a signal to the stack guide motor actuator 430 to move the stack guide 130. Once the stack guide 130 moves, the container 160 is repositioned to be in flush contact with the vertical portion 133 of the stack guide 130. Upon movement of the stack guide 130, the stack guide motor actuator 430 sends a signal to the controller 410, indicating that the stack guide 130 has been moved. The controller 410, receiving the signal that the stack guide 130 has repositioned, waits for another signal from the container detection sensor 420 or the carrier motor 450, indicating that the stack has been removed from the container. In some embodiments, this occurs when the carrier 365 sends a signal regarding its position, for example, that it is moving away from the belt 120 or the stack guide 130. In some embodiments, this occurs when the weight sensor senses a reduction in the weight on the belt 120, or when an electric eye detects the absence of the container 160. The controller 410 receives the signal indicating the container is no longer above or near the belt 120, or is moving away and then sends a signal to the stack guide motor actuator 430 which causes the stack guide 130 to move, whereby the stack guide 130 is brought into flush contact with the stack of articles.

In some embodiments, the container detection sensor 420 may comprise both an optical sensor and a weight sensor, wherein the optical sensor is configured to detect the presence of a container 160 about to be loaded onto the belt 120, and the weight sensor may detect when the container 160 has been removed from the belt, and each of the sensors is configured to send appropriate signals to the controller 410. For example, upon receiving a signal from the optical sensor, the controller 410 signals the stack guide motor actuator 430 to move the stack guide to accommodate the container 160, and upon receiving a signal from the weight sensor, the controller 410 signals the stack guide motor actuator 430 to move the stack guide back to its original position after the container 160 is removed.

In some embodiments, the controller 410 is in communication with the belt and paddle motors 440 are similar to those described elsewhere herein, specifically in reference to FIGS. 1 and 2. The communication between the controller 410 and the belt and paddle motors 440 allows the controller 410 to synchronize and/or coordinate the movement of the belt 120 and the paddle 150, for example, during unloading of the container or any other desired operation. In some embodiments, for example, the controller 140 may be configured not to signal movement of the belt 120 while the stack guide 130 is not in contact with the stack of articles on the belt 120.

Figure 5:
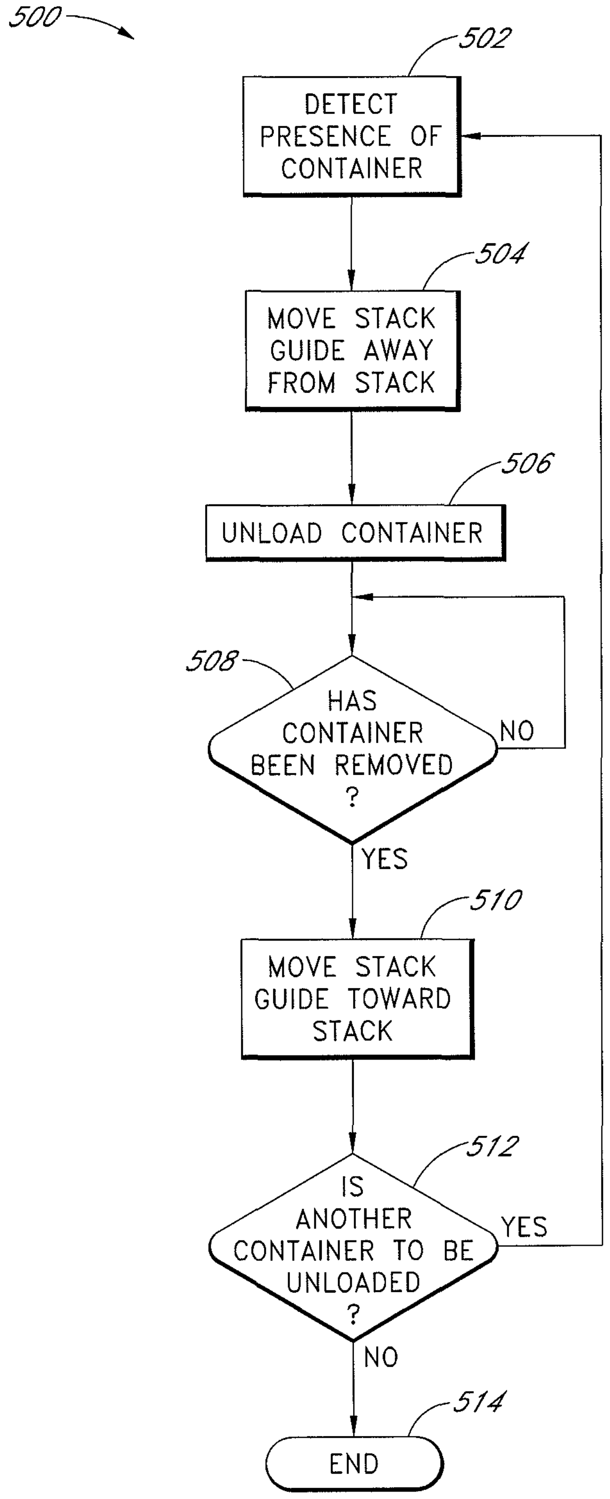
FIG. 5 is a flowchart depicting a process using a moveable stack guide.

FIG. 5 depicts a flowchart of a method of controlling the position of the stack guide 130. Process 500 begins at block 502, wherein the position of the container is received as described above. If the container is present, the process 500 moves to block 504, wherein the stack guide is moved away from the stack of articles, or from a first position to a second position. With the stack guide 130 moved away from the stack of articles, the process 500 moves to block 506, wherein the container is unloaded. The controller 410 may coordinate the movement of the belt and paddle motors 440 and carrier motor 450 to accomplish the container unload, as described elsewhere herein, and as described in U.S. patent application Ser. No. 13/797,731.

The process 500 next moves to decision state 508, wherein it is determined whether the container has been removed. This determination may be made as described above with regard to FIG. 4. If it is determined that the container 160 has not been removed from the belt 120, the process waits until the container 160 has been removed. If the container 160 has been removed, the process 500 moves to block 510, wherein the stack guide 130 is moved back to its original position, in contact with the stack of articles.

The process 500 next proceeds to decision state 512, wherein it is determined whether there is another container 160 to be unloaded. This determination may be made based on a predetermined number of containers to be unloaded which was input into the controller 410, and the controller 410 may count the number of containers 160 which have been unloaded. In some embodiments, this decision may be made based on receiving sensor input, manual input, or any other desired input following the unloading of each container 160. If another container 160 is to be unloaded, the process 500 returns to block 502. If there are no more containers 160 to unload, the process 500 ends in block 514.

A person of skill in the art will recognize that process 500 need not be performed in the exact order specified, and that some blocks of process 500 may be omitted, or other steps performed in addition to those described.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

The technology is operational with numerous other general purpose or special purpose computing system environments or configurations. Examples of well-known computing systems, environments, and/or configurations that may be suitable for use with the development include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present development.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present development. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

What is claimed is:

1. A stack feeder comprising:

a frame;

a singulator connected to the frame;

a conveyor disposed on the frame, the conveyor configured to receive a stack of articles and a container, the conveyor further configured to move the stack of articles and the container toward the singulator;

a motor connected to the frame;

a stack guide connected to the motor, wherein the stack guide comprises a continuous, planar surface disposed at a right angle to a plane of the conveyor, the continuous planar surface extending substantially parallel to a length of the conveyor, the continuous planar surface configured to contact an edge of the stack of articles; and wherein the motor is operable to move the planar surface of the stack guide from a first position, away from the conveyor, into a second position to accommodate receiving the container onto the conveyor, wherein the movement of the planar surface of the stack guide is within a plane parallel to the plane of the conveyor and is in a direction substantially perpendicular to the length of the conveyor.

2. The stack feeder of claim 1 further comprising:

a sensor configured to detect the presence of the container on the conveyor; and a controller in communication with the sensor and the motor, the controller configured to control movement of the motor to move the stack guide between the first position and the second position in response to detection of the presence of the container on the conveyor.

3. The stack feeder of claim 2, wherein the sensor is further configured to detect the absence of the container on the conveyor, and wherein the controller is configured to control the movement of the stack guide between the second and the first positions in response to detection of the absence of the container.

4. The stack feeder of claim 2, wherein, when the stack guide is in the first position, the stack guide is in contact with the stack of articles.

5. The stack feeder of claim 2, wherein, when the stack guide is in the second position, the stack guide is in contact with the container and not with the stack of articles.

6. The stack feeder of claim 4, wherein when the presence of the container is detected, the controller is configured to control movement of the stack guide from the first position to the second position.

7. The stack feeder of claim 5, wherein when the absence of the container is detected, the controller is configured to control movement the stack guide from the second position to the first position.

8. The stack feeder of claim 1, wherein the stack guide is moveable among a plurality of positions between the first position and the second position.

9. The stack feeder of claim 1, further comprising a mechanical linkage moveably connected between the motor and the stack guide:

wherein the mechanical linkage translates motion of the motor into motion of the stack guide;

wherein the container comprises a first wall having a first thickness; and wherein the mechanical linkage is adapted to move the stack guide a distance corresponding to the first thickness of the first wall.

10. A system for unloading a container comprising:

a container configured to hold articles;

an automatic stack feeder comprising:

a singulator;

a conveyor configured to receive a first stack of articles and the container, wherein the container has a second stack of articles therein, the conveyor further configured to move the first stack of articles and the container toward the singulator;

a stack guide aligned along the conveyor in a direction substantially parallel to a length of the conveyor, wherein the stack guide comprises a continuous, substantially vertical surface configured to contact an edge of the first and second stacks of articles received onto the conveyor, wherein the stack guide is moveable from a first position to a second position to accommodate receiving the container onto the conveyor, and wherein the movement of the continuous, substantially vertical surface of the stack guide is within a plane parallel to a plane of the conveyor and is in a direction substantially perpendicular to the length of the conveyor;

a sensor configured to detect the presence of the container on the conveyor; and a controller, in communication with the sensor, and configured to control movement of the stack guide between the first position and the second position in response to the presence of the container on the conveyor.

11. The system of claim 10, wherein the stack guide is configured to be in contact with the first stack of articles when the stack guide is in the first position.

12. The system of claim 10, wherein the stack guide is configured to be in contact with the container, and not in contact with the first stack of articles, when the stack guide is in the second position.

13. The system of claim 10, wherein the stack guide further comprises a motor in communication with the controller, and wherein the motor is configured to move the stack guide between the first and second positions.

14. The system of claim 10, wherein the sensor is further configured to detect the absence of the container on the conveyor, and wherein the controller is configured to control the movement of the stack guide between the second and the first position in response to the absence of the container.

15. The system of claim 10, wherein when the presence of the container is detected, the controller is configured to move the stack guide from the first position to the second position.

16. The system of claim 14, wherein when the absence of the container is detected, the controller is configured to move the stack guide from the second position to the first position.

17. The system of claim 10, wherein the stack guide is moveable among a plurality of positions between the first and the second positions.

18. A method of sorting articles comprising:

operating a stack feeder comprising a stack guide, the stack guide comprising a planar surface disposed at a right angle to a plane of the conveyor;

receiving a container having a first stack of articles therein onto a conveyor of the automatic stack feeder;

detecting the presence of the container on the conveyor;

moving the stack guide in a first direction within a plane parallel to the plane of the conveyor and substantially perpendicular to a direction of movement of the conveyor to accommodate receiving the container onto the conveyor and in response to the detected presence of the container;

unloading the first stack of articles from the container;

detecting the absence of the container; and moving the stack guide in a second direction within the plane parallel to the plane of the conveyor and substantially perpendicular to the direction of movement of the conveyor in response to the absence of the container.

19. The method of claim 18, wherein moving the stack guide in response to the detected presence of the container comprises moving the stack guide from a first to a second position.

20. The method of claim 19, wherein moving the stack guide in response to the absence of the container comprises moving the stack guide from the second position to the first position.

21. The method of claim 18 wherein unloading a second stack of articles from the container comprises:

moving the first stack of articles out of the container onto the conveyor;

combining the first stack of articles with a second stack of articles already on the conveyor; and removing the container from the conveyor.

22. The method of claim 21 further comprising contacting the stack guide with the combined first and second stacks of articles with the stack guide in the first position.

23. The method of claim 19, wherein, before detecting the presence of the container, the stack guide is in contact with the first stack of articles when the stack guide is in the first position.

24. The method of claim 20, wherein the stack guide is in contact with the container, and not in contact with the first stack of articles, when the stack guide is in the second position.

25. The method of claim 20, wherein the stack guide is connected to a motor which moves the stack guide from the first position to the second position and from the second position to the first position.

26. A system for sorting articles comprising:

operating a stack feeder comprising a stack guide, the stack guide comprising a planar surface disposed at a right angle to a plane of the conveyor;

means for receiving a container having a first stack of articles therein onto a conveyor of the automatic stack feeder;

means for detecting the presence of the container on the conveyor;

means for moving the stack guide in a first direction within a plane parallel to the plane of the conveyor and substantially perpendicular to a direction of movement of the conveyor to accommodate receiving the container onto the conveyor and in response to the detected presence of the container;

means for unloading the first stack of articles from the container;

means for detecting the absence of the container; and means for moving the stack guide in a second direction within the plane parallel to the plane of the conveyor and substantially perpendicular to the direction of movement of the conveyor in response to the absence of the container.

* * * * *